United States Patent
Gutierrez (10) Patent No.: US 12,254,196 B2
(45) Date of Patent: Mar. 18, 2025

(54) SYSTEM AND METHOD TO REDUCE POWER CONSUMPTION WHEN CONVEYING DATA TO A DEVICE

(71) Applicant: Advanced Micro Devices, Inc., Santa Clara, CA (US)

(72) Inventor: Raul Gutierrez, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/057,539

(22) Filed: Nov. 21, 2022

(65) Prior Publication Data

US 2024/0168658 A1 May 23, 2024

(51) Int. Cl.
  *G06F 3/06* (2006.01)
(52) U.S. Cl.
  CPC ............ *G06F 3/0625* (2013.01); *G06F 3/061* (2013.01); *G06F 3/0656* (2013.01); *G06F 3/0658* (2013.01); *G06F 3/0679* (2013.01)
(58) Field of Classification Search
  CPC .. G06F 2213/0042; G06F 12/02; G06F 12/14; G06F 13/385; G06F 13/28; G06F 13/387; G06F 13/00; G06F 13/38; G06F 13/4059; G06F 2213/24
  See application file for complete search history.

(56) References Cited

U.S. PATENT DOCUMENTS 3,992,634 A 11/1976 Larson
6,889,262 B1 5/2005 Gulick
7,281,074 B2 10/2007 Diefenbaugh et al.
7,340,550 B2 3/2008 Derr et al.
7,490,255 B2 2/2009 Diefenbaugh et al.
7,506,077 B2 3/2009 Hesse
8,166,221 B2 4/2012 Lee et al.
(Continued)

FOREIGN PATENT DOCUMENTS

EP 3352049 B1 4/2021

OTHER PUBLICATIONS

International Search Report and Written Opinion in PCT/US2023/079663, date mailed Feb. 13, 2024, 11 pgs.

*Primary Examiner* — Tasnima Matin
(74) *Attorney, Agent, or Firm* — Kowert, Hood, Munyon, Rankin & Goetzel, P.C.; Rory D. Rankin (57) ABSTRACT

Systems, apparatuses, and methods for moving data from a memory in a computing system to an I/O device. A system includes a processor, memory, I/O controller, and power management circuitry. An application stores data in the memory that is to be ultimately conveyed to an I/O device. The I/O controller is configured to convey the data to an I/O device according to a service interval. The I/O controller is configured to fetch a first data item from the memory stored by the application, and prefetch one or more additional data items from memory. The first data and prefetched data are stored in a locally accessible buffer of the I/O controller. The I/O controller is then configured to convey each of the first data and one or more data items from the buffer to the I/O device at regular intervals of time during a given period of time, prior to initiating a fetch of additional data from the memory. During the given period of time, the power management circuitry is configured to cause at least the memory to enter a reduced power state.

20 Claims, 5 Drawing Sheets

(56) References Cited

U.S. PATENT DOCUMENTS

| | | |
|---|---|---|
| 8,180,947 B2 | 5/2012 | Hesse et al. |
| 8,432,981 B1 | 4/2013 | An et al. |
| 8,650,427 B2 | 2/2014 | Knolla et al. |
| 8,949,636 B2 | 2/2015 | Diefenbaugh et al. |
| 9,490,791 B2 | 11/2016 | Liu et al. |
| 2003/0177297 A1* | 9/2003 | Hesse .................. G06F 13/387 710/305 |
| 2004/0153263 A1 | 8/2004 | Holle |
| 2008/0005445 A1* | 1/2008 | Diefenbaugh ........ G06F 13/385 710/313 |
| 2009/0132768 A1* | 5/2009 | Jones .................. G06F 12/0846 711/144 |
| 2013/0198538 A1 | 8/2013 | Diab et al. |
| 2013/0307525 A1 | 11/2013 | Chen |
| 2016/0246604 A1* | 8/2016 | Winrow ................ G06F 9/3808 |
| 2016/0321183 A1* | 11/2016 | Govindan ............. G06F 1/3296 |
| 2016/0371089 A1* | 12/2016 | Ma ........................ G06F 9/3836 |
| 2019/0104106 A1* | 4/2019 | Kumar .................. G06F 9/4887 |

\* cited by examiner

SYSTEM AND METHOD TO REDUCE POWER CONSUMPTION WHEN CONVEYING DATA TO A DEVICE

BACKGROUND

Description of the Related Art

During the design of a computer or other processor-based system, many design factors must be considered. A successful design may require a variety of tradeoffs between power consumption, performance, thermal output, and so on. For example, the design of a computer system with an emphasis on high performance may allow for greater power consumption and thermal output. Conversely, the design of a portable computer system that is sometimes powered by a battery may, at times, emphasize reducing power consumption at the expense of some performance. Whatever the particular design goals, a computing system typically has a given amount of power available to it during operation. Managing power consumption in modern computing systems is increasingly important and designers are constantly seeking ways to make improvements.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for moving data from a memory device to an I/O device in a computing system are disclosed. In various implementations, the timing of movement of data from a memory to an I/O Interface is altered in order to allow for increased idle time of one or more components of the computing system. Having increased idle time increases the opportunity for a component to enter a reduced power state that consumes less power than would otherwise be the case. In one implementation, a system includes a processor configured to service interrupts generated by an interrupt source. The interrupts source is configured to generate interrupts in order to cause the movement of data retrieved from memory to an input/output (I/O) device. In order to increase the amount of time the processor and/or memory is idle, the interrupt source is configured to change a timing of interrupts that cause the retrieval of data from memory and buffer the retrieved data prior to conveyance to the I/O device. Additionally, a buffer is used to prefetch data from the memory in a manner that increases an amount of time the memory subsystem is idle. Further details will be appreciated upon reference the following description.

Figure 1:
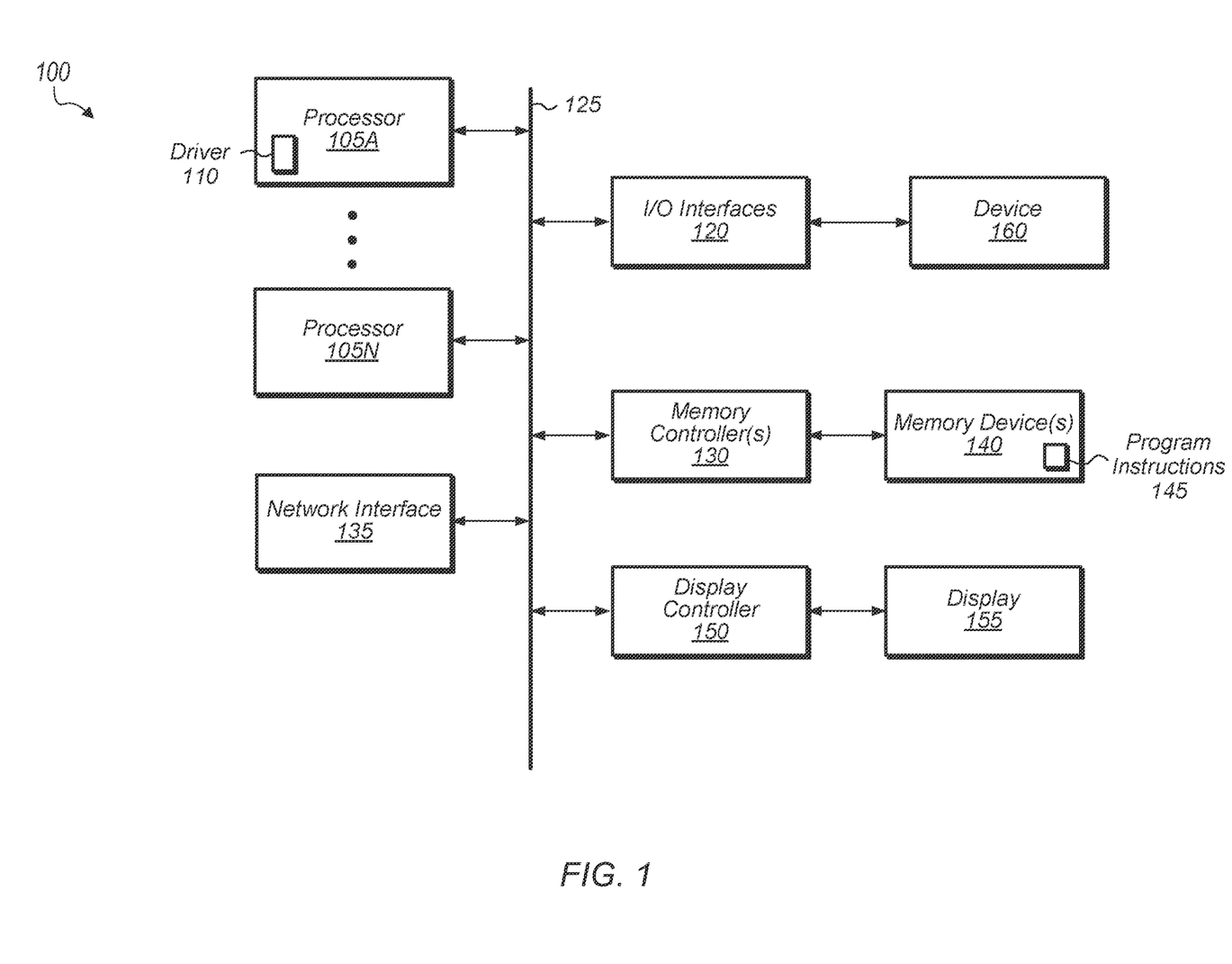
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus or data fabric 125 configured to allow movement of data between components in the system, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100. In various implementations, multiple components illustrated (and/or different components) are integrated into a single chip generally referred to as a System on a Chip (SoC).

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture, such as a chiplet graphics processing unit (GPU) which processes data, executes parallel processing workloads, renders pixels for display controller 150 to drive to display 155, and/or executes other workloads. In various implementations, and as used herein, the term "chiplet" refers to any device including, but not limited to, the following characteristics: 1) a chiplet includes an active silicon die containing part of the computational logic used to solve a full problem (i.e., the computational workload is distributed across multiples of these active silicon dies); 2) chiplets are packaged together as a monolithic unit on the same substrate; and 3) the programming model preserves the concept that these separate computational dies are a single monolithic unit (i.e., each chiplet is not exposed as a separate device to an application that uses the chiplets for processing computational workloads). A chiplet GPU is a complex integrated circuit that performs graphics-processing tasks across multiple semiconductor dies. For example, a GPU executes graphics-processing tasks required by an end-user application, such as a video-game application. GPUs are also increasingly being used to perform other tasks which are unrelated to graphics. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for a meta-app, a second set of program instructions for a driver component, and so on. Alternatively, program instructions 145 can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) can be coupled to I/O interfaces 120. Such peripheral devices include (but are not limited to) displays, keyboards, mice, printers, scanners, joysticks or other types of game controllers, headphones, microphones, media recording devices, external storage devices, and so forth. Network interface 135 is able to receive and send network messages across a network via either wired and/or wireless connections.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
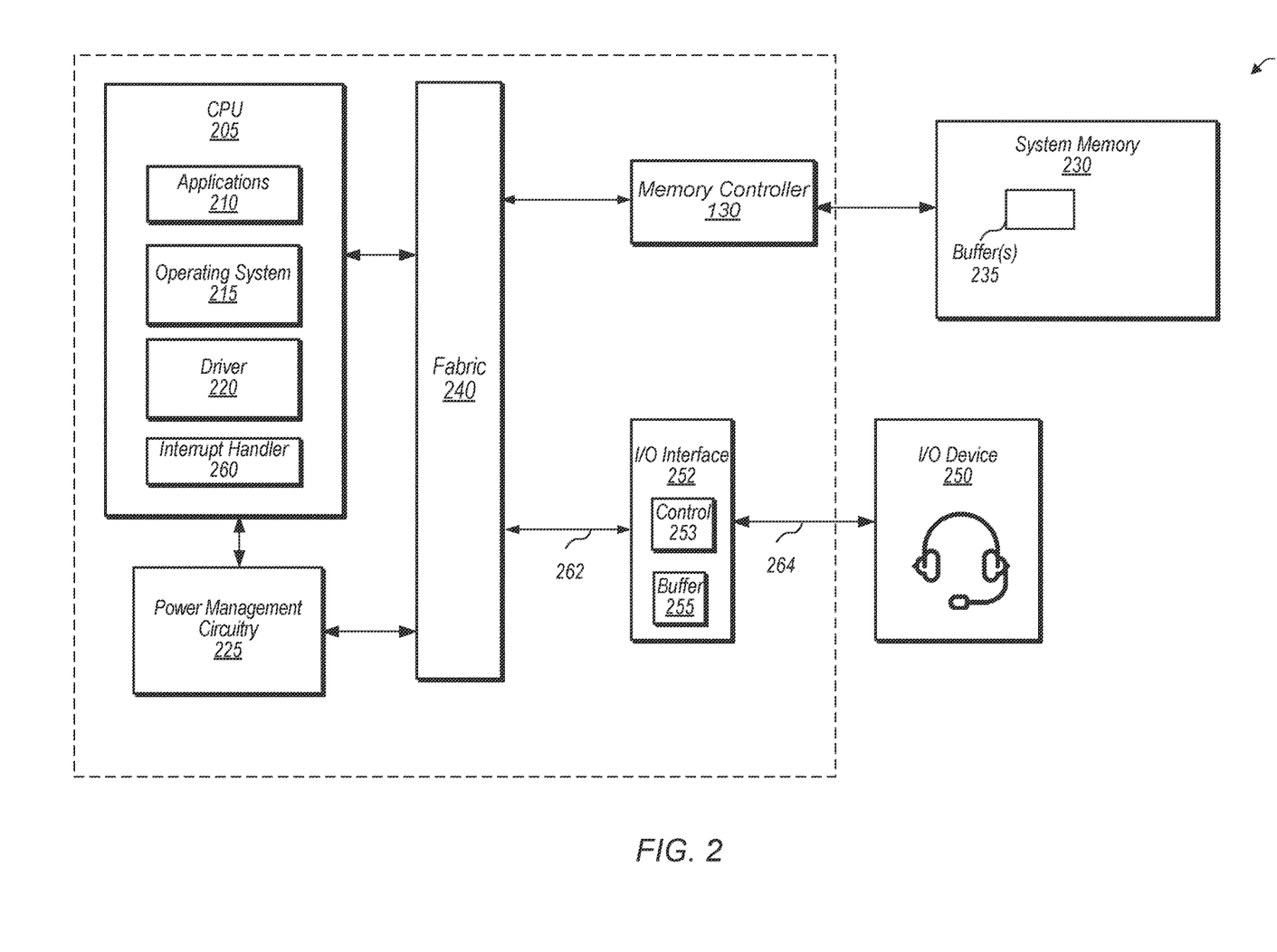
FIG. 2 is a block diagram of one implementation of a computing system.

Turning now to FIG. 2, a block diagram illustrating a processing system 200 in accordance with various implementations is shown. In the depicted example, the system 200 includes a central processing unit (CPU) 205 for executing instructions. In various implementations, the CPU 205 is connected via data fabric 240 to a system memory 230, which may be implemented using dynamic random access memory (DRAM), static random access memory (SRAM), nonvolatile RAM, and/or otherwise. In one implementation, system memory 230 includes buffers/data structures 235 ("buffers") for storing data that is to be conveyed to an I/O device 250. In various implementations, the data and/or data structures in buffers 235 are generated by an application 210. Any of a variety of types of buffers may be used, including ring buffers, ping-pong buffers, double buffers, or otherwise. As used herein, a "ring buffer" is a circular queue with no head or tail, per se, that keeps track of the head and tail of data stored in the buffer using pointers. A "ping-pong" buffer is a buffer that includes two portions. While a first portion of the ping-pong buffer is being filled, the second portion of the buffer may be read from. Subsequently, filling and reading from the buffers may switch so that the second portion is being filled while the first portion is being read. A "double buffer" is similar to a ping-pong buffer in that it includes two portions. However, in contrast to a ping-pong buffer, the double buffer always fills one portion and always reads from the other portions. Numerous such embodiments are possible and are contemplated.

As illustrated, the CPU 205 includes processes corresponding to one or more application(s) 210, operating system 215, a user mode driver 220 (or other drivers, such as a kernel mode driver). In various implementations, the one or more applications 210 include applications configured to cause the conveyance of data to an I/O device 250. For example, in some implementations the application 210 is associated with a game, music playing application, video/audio conferencing, or otherwise. In such implementations, audio associated with the application is conveyed to the I/O device 250 which could include headphones, speakers, or otherwise. In various implementations, the I/O device 250 is a USB device and the I/O Interface 252 is a USB host controller. The I/O Interface includes a first interface 262 configured to retrieve data from memory 230, and a second interface 264 configured to convey data to I/O Device 250. In some implementations, the application 210 is configured to cause the conveyance of video/image data to a device via the interface 252. In such cases, the device may be, or include, a display device, and the interface 250 may be configured to support other, different, communication protocols.

In addition, in some implementations, application 210 is configured to instruct the I/O Interface 252 how often to move data from memory to an I/O Device 250. In various implementations, the I/O Device is universal serial bus (USB) device and I/O Interface 252 is a USB host controller (e.g., an eXtensible Host Controller Interface). In such an implementation, this data is moved from system memory 230 to the USB device 250 via the USB controller 252. This is often referred to as USB Data Playback. Whether a USB context or otherwise, in some implementations the software 210 instructs the I/O Interface 252 how much data to move and how often to push the data to the device (e.g., 100B every 125 us). This data push rate may be determined by the device type. As many devices do not implement large buffering capability, they may be required to receive data frequently and as quickly as possible. This creates a situation where the data push rate results in an interrupt rate to system memory which doesn't permit system memory or the processor (or other components) to enter long periods of idle time and the reduced power states that might otherwise be entered.

In some implementations, the application 210 utilizes an application programming interface (API) to invoke a user mode driver 220. User mode driver 220 issues one or more commands to communicate with I/O Interface 252. Based on the instructions issued by application 210 to the user mode driver 220, the user mode driver 220 formulates commands that specify one or more operations for I/O Interface 252 to perform. In some implementations, the user mode driver 220 is a part of the application 210 running on the CPU 205. For example, the user mode driver 220 may be part of a gaming application running on the CPU 205. Similarly, a kernel mode driver (not shown) may be part of an operating system running on the CPU 205.

In addition to the above, CPU 205 is shown to include an Interrupt handler 260. In one implementation, when receiving an interrupt from within, or coupled to, the system (e.g., I/O Interface 252), interrupt handler 260 forwards the interrupt to control software executing on CPU 205. In one implementation, interrupt handler 260 generates data to forward along with the generated interrupt data generated. The data can include information such as the identifier (ID) of the entity that generated the interrupt, and/or other data. When an interrupt is received, the CPU 205 responds by taking an action required or otherwise indicated by the interrupt. For example, in various implementations, application 210 is configured to generate an interrupt to cause data to be stored in memory 230, and I/O Interface 252 is configured to generate an interrupt in order to cause data to be retrieved from the memory 230 (e.g., when additional data from the memory is required).

As an example, an application 210 may periodically (or non-periodically) generate an interrupt to cause data to be stored in memory 230. For example, during a video conference, audio associated with the conference may be received and stored in buffer(s) 235 in memory. I/O interface 252 is configured to retrieve the data from buffer 235 and convey it to the I/O device 250. As shown in FIG. 2, I/O Interface 252 includes control circuitry 253 configured to control various functions including at least initiating and managing receipt/retrieval of data, conveying data to the I/O Device 250, and storing data in a buffer 255. While streaming audio data to the I/O Device 250, data required to continue the audio stream may not be available to the I/O Interface 252. In such a case, it is necessary to retrieved additional data from memory 230 in order to continue the audio stream without interruption. By generating an interrupt, the I/O Device 252 causes the CPU 205 to initiate a process that moves data from the memory 230 to the I/O Interface 252. In order to service the interrupt, the CPU 205 must be awake. In other words, if the CPU 205 is in a reduced power state that isn't capable of servicing the interrupt, it must exit the reduced power state before the interrupt can be serviced. Consequently, servicing interrupts has a side effect of requiring the consumption of more power than if the CPU 205 were to remain in the lower power state.

In an alternative implementation, the I/O Interface 252 may use direct memory access (DMA) in order to retrieve data from the memory 230. In such an implementation, an interrupt is not generated and the processor is not required to cause the movement of data from the memory. Consequently, if the processor is in a reduced power state at a time the data is required, it need to exit the reduced state. However, the memory 230, as well as a path between the memory 230 and I/O Interface 252 (e.g., Fabric 240) must be awakened, if in a reduced power state, in order to enable the movement of data. Consequently, these components cannot be in a reduced power state during movement of the data—irrespective of whether an interrupt or DMA is used to move the data. Methods and mechanisms for enabling reduced power consumption while servicing interrupts are discussed in greater detail below.

Also illustrated in FIG. 2 is a Power Management Circuit (ry) 225. As noted above, various components (e.g., the CPU 205, Fabric 240, Memory 230, etc.) are capable of entering a reduced power state in order to conserve power. In various implementations, Power Management Circuit 225 is configured to monitor activity of components within the system 200 and cause one or more components to enter and/or exit various power-performance states. As an example, if CPU 205 is detected to be in an idle state, or otherwise have a reduced activity level, the Power Management Circuit 225 can cause the CPU 205 to enter a reduced power-performance state such that it consumes less power. Similarly, the Fabric 240 and memory 230 can be placed in a reduced power state depending on a state of the system and various conditions. Various such mechanisms are known in the art and are contemplated.

Figure 3:
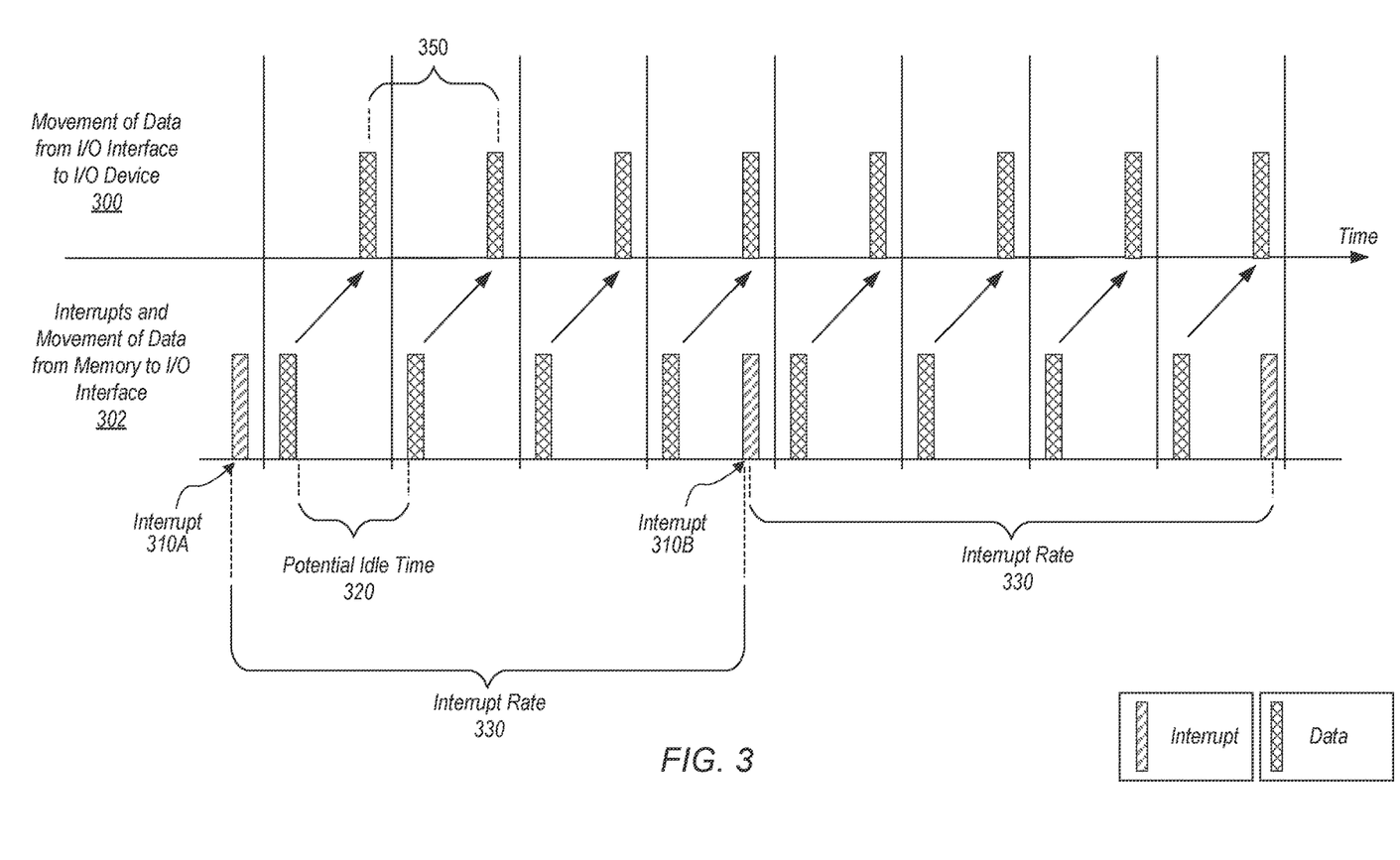
FIG. 3 is a diagram illustrating the movement of data from a memory to an I/O device.

Turning now to FIG. 3, one implementation of a system for moving data to an I/O device is illustrated. FIG. 3 illustrates a timeline that progresses from left to right. A legend at the lower right corner of the figure distinguishes between interrupts and data movement. In the lower half of the figure (302), the generation of interrupts and movement of data from memory to a host controller is shown. The upper half of the figure (300) illustrates the movement of data from the host controller to an I/O device.

As shown in the figure, interrupts (e.g., 310A-310B) are generated by software (e.g., application 210) or hardware (in a DMA based implementation) that cause data to be produced and stored in memory (e.g., buffer 235 in memory 230). In various implementations, these interrupts (310) are generated at a rate determined by a variety of factors. Such factors may include various data rates associated with generation or receipt of data, buffer sizes in memory (e.g., 235) and elsewhere in the system, memory access latencies, I/O Device requirements, and otherwise. As noted above, in a given implementation, software instructs the I/O Interface on the amount of data to be conveyed to the device and with what frequency. For example, software may access the I/O Interface and perform a write to one or more configuration registers to program the device with such information. Alternatively, the I/O Interface may be programmed to access a location in memory that stores such information. Various such implementations, and combinations of such implementations, are possible and are contemplated.

Figure 4:
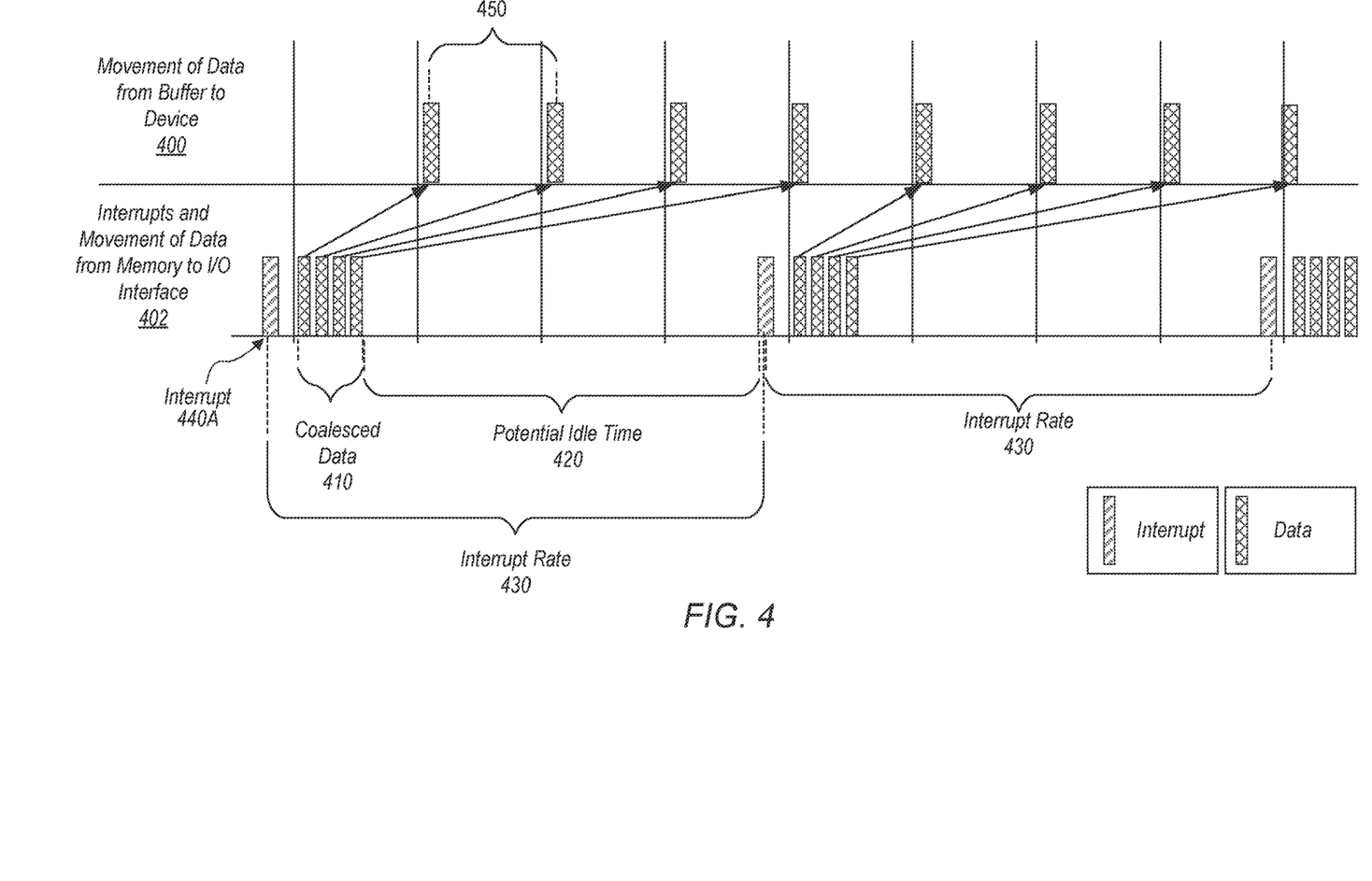
FIG. 4 is a diagram illustrating the movement of data from a memory to an I/O device.

As shown in the example of FIG. 3, the interrupts 310A-310B generated by software are shown to occur with a given frequency 330. In various implementations, the interrupts frequency 330 generally corresponds to requirements associated with the application and I/O Device. For example, in a scenario in which audio data is being conveyed to USB device, the data transfers are isochronous in that they occur with a regular frequency 350 which may be referred to as the service interval. This may be required in order to satisfy particular quality of service (QoS) requirements. In other implementations, data transfers are not isochronous and particular QoS requirements need not be met for a given scenario. As shown in FIG. 3, an interrupt 310A occurs at a first point in time which is followed by four transfers of data from memory to the I/O Interface before the next interrupt 310B occurs (shown along the lower half of the FIG. 302). As shown, after each transfer of data from the memory to the I/O Interface, data is moved from the I/O Interface to the I/O Device (shown along the upper half of the FIG. 300). It is noted that on start up the interrupt 310A may not be present. Rather, the corresponding application (e.g., application 210) may have already stored data in memory for retrieval by the I/O Interface. In such a case, the first interrupt generated may be interrupt 310B when the I/O Interface determines additional data is required. FIG. 3 and FIG. 4 assume this is not a startup scenario and the interrupt 310A (and 440A) are generated in order to retrieve additional data.

In the illustrated implementation of FIG. 3, when the I/O Interface receives (or retrieves) data following an interrupt 310, the data includes metadata that indicates additional data is available in the memory. For example, when the software stores data in the memory, metadata associated with the data (e.g., in the form of descriptors, or otherwise) indicates one or more of—an identification of how much additional data has been stored in the memory, an identification of a location of the additional stored data (e.g., a pointer to, or address of, a next data item in a sequence), an indication of an order in which data that has been stored in the memory is to be conveyed to the I/O Device, and a rate at which data is to be conveyed to the I/O Device. Other information is possible and is contemplated. In this example, subsequent to receiving or retrieving data by the I/O Interface (e.g., the first data transfer after interrupt 310A), the Interface is informed by metadata received with the data regarding the additional data. Based on this additional information, the I/O Interface receives/retrieves data from memory three more times before the next interrupts 310B occurs. For example, an additional access to memory is performed at a time required to meet current requirements of the I/O Device. It is noted that while reference is made to four transfers of data between interrupts, this is for discussion purposes only. The number of transfers can be any of a variety of number of transfers as appropriate for the given context or scenario.

While the implementation of FIG. 3 results in a consistent stream of data to the I/O Device, it includes multiple memory accesses spaced (in time) in a manner that fixes a maximum amount of time the memory and path to the I/O Device can potentially be idle 320. In the example shown, this given period of time (potential idle time) 320 generally corresponds to the service interval 350. If an interrupt based mechanism is used, the processor serving the interrupts will also be limited by this maximum amount of time. In other words, because the path and memory (and potentially processor) must be awake to provide the data, they can at most be idle for the amount of time indicated by potential idle time 320. As discussed above, increased idle time can be used to reduce power consumption. When idle time is capped, as illustrated, then potential power consumption savings are likewise capped. In view of this, an alternative implementation is discussed below.

FIG. 4 illustrates an implementation in which potential idle times, and power consumption savings, is increased. Similar to FIG. 3, FIG. 4 shows the movement of data from memory to the I/O Interface in the lower half of the figure (402) and movement of data from I/O Interface to the Device in the upper half of the figure (400). In various implementations, the I/O Interface includes a buffer configured to store data received from memory. The size of the buffer is such that it can store a sufficient amount of data to avoid the need to retrieve additional data from the memory for at least a given period of time. In effect, the buffer serves as a prefetch buffer to store data prefetched from memory in advance of a point in time at which the data is actually needed by the I/O Device.

As illustrated in the example, an interrupt 440A which generally corresponds to the interrupt 310A of FIG. 3, occurs with a given rate 430. In various implementations, this interrupt rate 430 is unchanged from that of interrupt rate 330 (as shown in FIG. 3). In other implementations, it differs from that of FIG. 3. Interrupt 440A is configured to cause storage of data in memory. For example, as discussed above, interrupt 440A may be generated by software that is configured to cause data, ultimately intended for conveyance to an I/O Device, to be stored in memory. Subsequent to the data being stored in memory, the I/O Interface is configured to cause movement of the data from the memory to the I/O Interface according to a service interval 450, and ultimately to the I/O Device. However, in contrast to the implementation of FIG. 3, instead of the I/O Interface causing the movement of data from the memory to the I/O Interface at the intervals illustrated in FIG. 3 (e.g., the four, distinct, movements of data from the memory to the I/O Device following interrupt 310A), the multiple movements of data are effectively coalesced.

For example, as shown in FIG. 4, movement of data from memory to the I/O Interface is coalesced 410 such that the movements occur within a compressed period of time as compared to that of FIG. 3. In particular, after retrieval of the first item of data (shown as the first data of the coalesced data 410), further data items are prefetched from the memory (e.g., the remaining three data items of data 410). In some implementations, each data item fetched from memory indicates a location of a next data item to be fetched. As previously described, in the implementation of FIG. 4 the I/O Interface includes a buffer sufficient in size to store the coalesced data. In various implementations, the movement of the data from the memory to the I/O Interface can be interrupt driven, DMA based, or via any other suitable mechanism or protocol. Similar to the movement of data from the memory to the I/O Interface in FIG. 3, the memory and a path between the memory and I/O Interface must be awake in order for the data to be retrieved from memory and moved to the I/O Interface. If an interrupt driven mechanism is used to move the data, the processor will likewise need to be awake/awakened to service the interrupt. However, in contrast to FIG. 3, the movement of data from the memory in FIG. 4 is compressed into a shorter period of time and accumulated in the buffer. Consequently, the period of time during which the memory and path (and potentially the processor) must be awake corresponds to the shorter period of time reflected by the coalesced data 410. This increases the period of time during which the memory, path, and/or processor, can be idle, as shown by potential idle time 420. This potential idle time is longer compared to that described in relation to FIG. 3 (i.e., potential idle time 320). Additionally, while the service interval 450 generally remains unchanged as compared to service interval 350 of FIG. 3, the potential idle time 420 does not correspond to the service interval 450 as was the case in FIG. 3. Consequently, each of the memory, path, and/or processor, is potentially able to enter an idle state for a longer period of time and enter a reduced power state such that overall power consumption is reduced.

Figure 5:
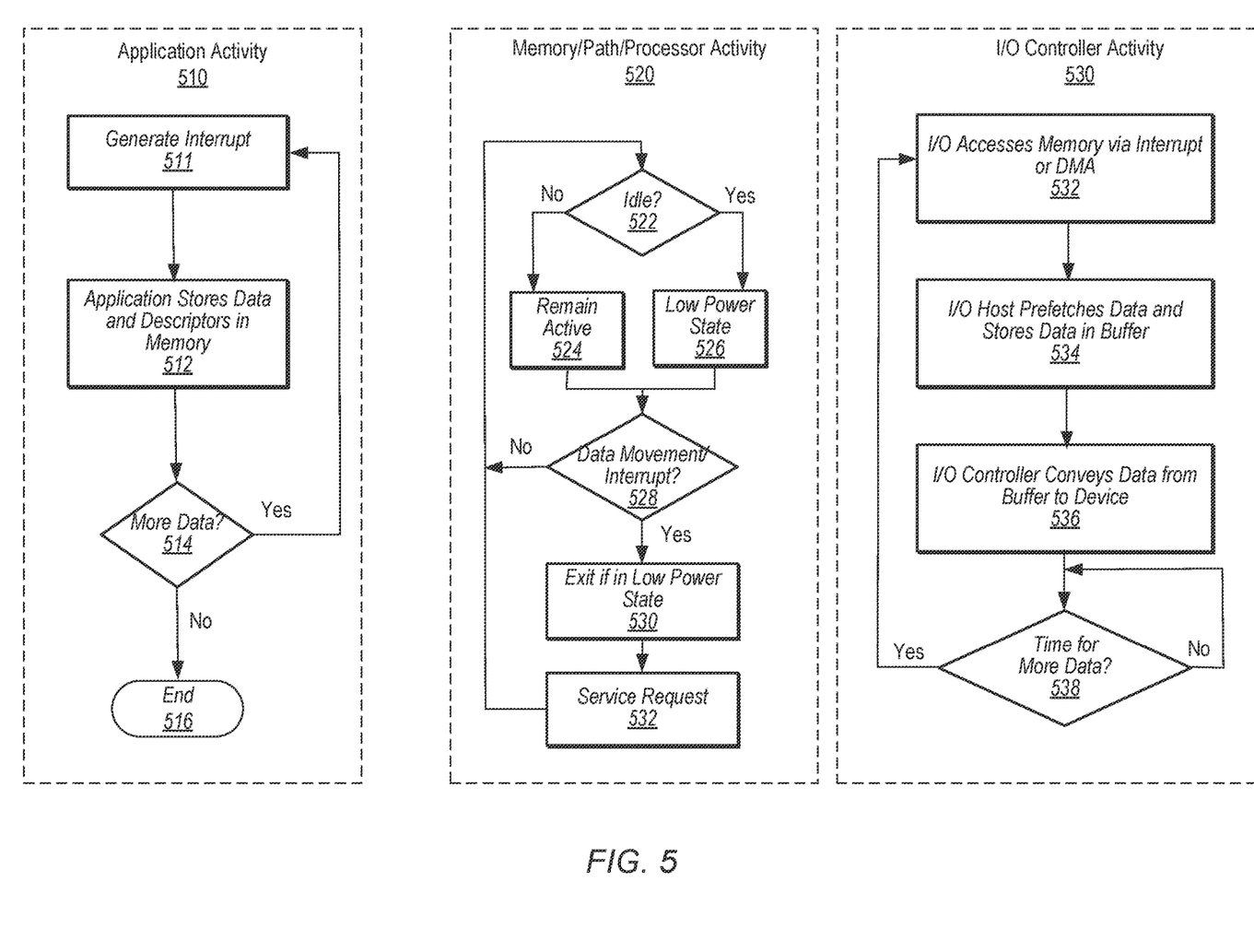
FIG. 5 illustrates activities of computing system components during movement of data from a memory to an I/O device.

Turning now to FIG. 5, a method for moving data to an I/O Device with reduced power consumption is illustrated. As shown in the example, methods corresponding to software Application Activity 510, Memory/Path/Processor Activity 520, and I/O Controller Activity 530 are shown. Generally speaking, the activities (510, 520, 530) occur within a computing system concurrently. In the first block (510), a software application (e.g., 210) is configured to store data in memory for subsequent conveyance to an I/O Device. As discussed above, the application may correspond to a video game, teleconferencing application, or otherwise. As shown, the application generates an interrupt 511 when data is to be stored in memory. The application then stores data and associated metadata (e.g., descriptors) in memory 512. If more data is to be stored in memory 514, interrupts are generated 511 and data stored in memory.

Concurrent with activities of the software, various system components (memory, data paths, processor) perform actions 520 associated with the movement of the data to the memory and to the I/O Interface. As illustrated, if one of these components is in an idle state 522, then it enters a low power state 526 if not already in such a state. For example, responsive to detecting an idle state of a component, the power manager 225 may cause the corresponding component to enter a reduced power state. Otherwise, the component is active 524. At a given point in time, movement of data is indicated 528. For example, movement of data is indicated by the application generating an interrupt 511. If such an indication is detected, then the processor exits a low power state 530 (if in such a state) and services the interrupt 532. Otherwise, if no such movement of data is indicated 528, the method returns to block 522 where the process is repeated.

Also concurrent with activities 510 and 520, the I/O Controller performs activities 530 to support movement of data to an I/O Device. As shown in the example, subsequent to being programmed (e.g., by the application 210) to service an I/O Device, the I/O Controller accesses memory to retrieve data stored by the application 532. As described above, this access may be via interrupt, DMA, or otherwise. If an interrupt is generated by the I/O Interface, the processor will service the interrupt as described in relation to Activity 520 via detection of the interrupt 528. If the access is not interrupt generated (e.g., it is via DMA or otherwise), then the processor need not service the request. However, an components in the data path and the memory must be awake to service the request 532 and must exit a low power state 530 as needed.

Subsequent to accessing memory 532, the I/O Controller prefetches sufficient data from the memory to service multiple transfers of data to the I/O Device and stored the prefetched data in a buffer. In various implementations, the buffer is local to the I/O Interface as illustrated in FIG. 2. In other implementations, the buffer coupled to the I/O Interface in a manner such that accessing the buffer doesn't require traversing the Fabric 240 and/or otherwise requiring multiple other system components be awake (i.e., not in a reduced power state that would require exiting in order to service the access). Having prefetched the data, the I/O Controller then conveys data from the buffer to the I/O Device at given time intervals 538. In some implementations, the time interval(s) is programmed by the application 210. In other implementations, the I/O Device provides data on initialization that indicates to the I/O Controller such an interval. Various such methods for determining such a time interval are known and are contemplated.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a first interface configured to receive data from a memory;
   a second interface configured to convey data to an input/output (I/O) device; and
   a control unit comprising circuitry, wherein responsive to receipt of a first interrupt the control unit is configured to:
     fetch a first data item from the memory;
     prefetch one or more data items from memory;
     store the first data item and the one or more data items in a buffer; and
     convey, to the I/O device via the second interface, each of the first data and the one or more data items from the buffer at intervals of time during a period of time, prior to initiating a fetch of additional data items from the memory in response to receipt of a second interrupt.

2. The apparatus as recited in claim 1, wherein the circuitry is configured to fetch both the first data item and prefetch the one or more data items during a period of time that is less than an interval of time of the intervals of time.

3. The apparatus as recited in claim 1, wherein each of the intervals of time corresponds to a service interval.

4. The apparatus as recited in claim 3, wherein the apparatus is a universal serial bus (USB) controller and the I/O device is a USB device.

5. The apparatus as recited in claim 1, wherein the circuitry is configured to fetch the first data item and one or more data items from memory using direct memory access.

6. The apparatus as recited in claim 1, wherein the circuitry is configured to fetch the first data item and one or more data items from memory using an interrupt based mechanism.

7. The apparatus as recited in claim 6, wherein the circuitry is configured to generate an interrupt to fetch the first data item.

8. A method comprising:
   responsive to receiving a first interrupt:
     fetching, by an I/O controller, a first data item from a memory via a first interface;
     prefetching, by the I/O controller, one or more data items from memory via the first interface;
     storing, by the I/O controller, the first data item and one or more data items in a buffer; and
     conveying, by the I/O controller to an I/O device, each of the first data item and the one or more data items from the buffer to an I/O device, wherein the conveying is at intervals of time during a period of time prior to fetching additional data items from the memory in response to receipt of a second interrupt.

9. The method as recited in claim 8, further comprising fetching, by the I/O controller, both the first data item and prefetching the one or more data items during a period of time that is less than an interval of time of the intervals of time.

10. The method as recited in claim 8, wherein each of the intervals of time corresponds to a service interval.

11. The method as recited in claim 8, wherein the I/O controller is a universal serial bus (USB) controller and the I/O device is a USB device.

12. The method as recited in claim 8, comprising fetching, by the I/O controller, the first data item and one or more data items from memory using direct memory access.

13. The method as recited in claim 8, comprising fetching, by the I/O controller, the first data item and one or more data items from memory using an interrupt based mechanism.

14. The method as recited in claim 13, wherein the I/O controller is configured to generate an interrupt to fetch the first data item.

15. A system comprising:
  a processor;
  power management circuitry; and
  an input/output (I/O) controller configured to, responsive to receipt of a first interrupt:
    fetch a first data item from a memory;
    prefetch one or more data items from memory;
    store the first data item and the one or more data items in a buffer; and
    convey, to an I/O device, each of the first data and the one or more data items from the buffer at intervals of time during a period of time, prior to initiating a fetch of additional data items from the memory in response to receipt of a second interrupt.

16. The system as recited in claim 15, wherein the I/O controller is configured to fetch both the first data item and prefetch the one or more data items during a period of time that is less than an interval of the intervals of time.

17. The system as recited in claim 15, wherein each of the intervals of time corresponds to a service interval.

18. The system as recited in claim 15, wherein the power management circuitry is configured to cause the memory to enter a reduced power state during the period of time.

19. The system as recited in claim 15, wherein the I/O controller is configured to fetch the first data item and one or more data items from memory using direct memory access.

20. The system as recited in claim 15, wherein the I/O controller is configured to generate an interrupt for servicing by the processor to fetch the first data item.

* * * * *